US007583273B2

(12) United States Patent
Florence et al.

(10) Patent No.: US 7,583,273 B2
(45) Date of Patent: Sep. 1, 2009

(54) METHOD AND SYSTEM FOR TRANSFORMING SPATIAL DATA

(75) Inventors: Edward Florence, Toronto (CA); David Hunter, Toronto (CA); Andrew Patterson, Toronto (CA)

(73) Assignee: Avenza Systems, Inc., Toronto (CA)

( * ) Notice: Subject to any disclaimer, the term of this patent is extended or adjusted under 35 U.S.C. 154(b) by 547 days.

(21) Appl. No.: 11/070,354

(22) Filed: Mar. 2, 2005

(65) Prior Publication Data

US 2006/0204133 A1 Sep. 14, 2006

(51) Int. Cl.
G09G 5/00 (2006.01)
(52) U.S. Cl. .................. 345/629; 345/619; 345/672
(58) Field of Classification Search ................ 345/619, 345/629, 672–680, 645, 419, 440, 660; 715/763, 715/769, 838, 835, 853; 382/284, 293, 294
See application file for complete search history.

(56) References Cited

U.S. PATENT DOCUMENTS

| 5,418,906 | A * | 5/1995 | Berger et al. .................. 702/5 |
| 5,631,970 | A * | 5/1997 | Hsu ........................... 382/113 |
| 5,900,874 | A | 5/1999 | Shrader et al. |
| 6,732,120 | B1 * | 5/2004 | Du ......................... 707/104.1 |
| 7,047,131 | B2 * | 5/2006 | Yoon et al. .................. 701/212 |
| 7,099,492 | B2 * | 8/2006 | Rhoads ....................... 345/629 |
| 7,194,389 | B2 * | 3/2007 | Damron ...................... 382/293 |
| 2002/0194196 | A1 | 12/2002 | Weinberg et al. |
| 2003/0154060 | A1 * | 8/2003 | Damron ......................... 703/2 |
| 2005/0114354 | A1 * | 5/2005 | Singh et al. ................... 707/10 |
| 2005/0179684 | A1 * | 8/2005 | Wallace ...................... 345/419 |
| 2005/0270311 | A1 * | 12/2005 | Rasmussen et al. ......... 345/677 |
| 2005/0273725 | A1 * | 12/2005 | Russon et al. ............... 715/780 |
| 2005/0285876 | A1 * | 12/2005 | Balaga et al. ............... 345/629 |
| 2006/0197781 | A1 * | 9/2006 | Arutunian .................... 345/629 |
| 2006/0200384 | A1 * | 9/2006 | Arutunian et al. ............. 705/14 |
| 2007/0050340 | A1 * | 3/2007 | von Kaenel et al. ............ 707/3 |
| 2008/0016472 | A1 * | 1/2008 | Rohlf et al. ................. 715/848 |

FOREIGN PATENT DOCUMENTS

EP 0 509 839 A2 10/1992

OTHER PUBLICATIONS

Carbon Project Inc., "Gaia 3 User's Guide", 2004-2007, pp. 1-23.*
Centre for Advanced Spatial Analysis University College London, "Help Displaying Maps", www.Maptube.org, 1999-2008.*

(Continued)

*Primary Examiner*—Chante Harrison
(74) *Attorney, Agent, or Firm*—Preti Flaherty Beliveau & Pachios LLP

(57) ABSTRACT

A method for transforming spatial data includes displaying a first graphical representation that represents spatial data formatted in a first coordinate system and displaying a second graphical representation that represents spatial data formatted in a second coordinate system. The data represented by the first graphical representation is transformed into the second coordinate system in response to the first graphical representation being dragged and dropped onto the second graphical representation. In another aspect, a computer-readable medium contains instructions for controlling a computer system to perform a method of transforming spatial data.

15 Claims, 4 Drawing Sheets

OTHER PUBLICATIONS

Rosset, Antoine, et al: "OsiriX: An Open-Source Software for Navigating in Multidimensional DICOM Images," Journal of Digital Imaging, Unders, Philadelphia, PA, USA, vol. 17, No. 3, Sep. 1, 2004, pp. 205-216, XP002435194, ISSN: 0897-1889.

Erdas: "Erdas Imagine V8.4" Internet Citation (Online), Nov. 1, 1999, p. Complete, XP007907254, Retrieved from the Internet: URL: http://www.scribd.com/doc/7206614/WhatsNew>.

"Getting to Know ArcView GIS: the geographic information system for everyone," 1999, Environmental Systems Research Institute, Inc., California, USA, XP002516232.

Adobe Systems Inc: "Adobe Photoshop CS—User Guide," 2003, Adobe Systems Inc., San Jose, California 95110, USA, XP002516303.

* cited by examiner

METHOD AND SYSTEM FOR TRANSFORMING SPATIAL DATA

BACKGROUND OF THE INVENTION

This invention relates generally to software capable of transforming spatial data, and more particularly to transforming spatial data in connection with the production of maps.

A geographic information system (GIS) generally refers to a digital representation of geographically referenced information structured to support spatial analysis. While having many purposes, GIS data files have been found to be particularly useful in electronic map production. GIS data are formatted into a set of parameters that define how the data are displayed or interpreted as a map. These parameters, which typically include projection (including various subfactors, such as parallels (meridians), spheroid and zones, depending on the projection), position on screen, scale, units and angle of rotation, are collectively referred to as a "co-ordinate system." A co-ordinate system can contain all or part of this set of parameters.

A projection is a vital part of displaying geographic data. "Projection" is a cartographic term for a mechanism (typically a mathematical algorithm) of portraying the spherical surface of the earth, or a portion thereof, on a flat surface. In displaying the earth on a flat surface some distortions of conformality, distance, direction, scale and area always result from the process; no projection is perfect. Different projections allow mapmakers to balance these various distortions, favoring one truth over another as best suited for a particular application. Every projection has advantages and disadvantages; for instance, some are better for depicting small areas while others are better for depicting large areas. There are hundreds of different projections in use today, each with its own unique formula and set of distortions.

As used herein, a transformation of spatial data refers to a change in some or all of the parameters defining the co-ordinate system in which the data is formatted. As such, a spatial data transformation is the conversion from one co-ordinate system to another. Mapmaking often requires spatial data transformations to utilize data that are formatted in different coordinate systems. For example, a first data file may contain political boundary data for a geographic area and a second data file may contain road data for the same geographic area. Using data from both files could produce a map of the geographic area showing both political boundaries and roads. However, if the two data files had different projections, then it would be necessary to "re-project" one set of data so that the projections matched. Re-projection is the mathematical process of moving spatial data from one projection to another. This can be done but typically involves a complicated mathematical process. Automated systems for achieving spatial data transformations are available but require the user to open a dialogue box and provide detailed input. Current software mechanisms that allow users to transform spatial data generally work by either providing a list of predefined projections for users to choose from, an interface to define all aspects of the projection, or a combination of the two. In all cases, however, this is a menu-driven process and requires deep knowledge and complex decision-making. This process is very time consuming and so difficult to use that users generally require special training to use it. The process must be repeated every time the user wishes to view the data in a different projection.

Accordingly, it would be desirable to have software that is capable of transforming spatial data in a more efficient and accurate manner, whether for cartographic or other purposes.

SUMMARY OF THE INVENTION

The above-mentioned need is met by the present invention, which provides, in one aspect, a method for transforming spatial data that includes displaying a first graphical representation that represents spatial data formatted in a first coordinate system and displaying a second graphical representation that represents spatial data formatted in a second coordinate system. The data represented by the first graphical representation is transformed into the second coordinate system in response to the first graphical representation being dragged and dropped onto the second graphical representation.

In another aspect, the present invention provides a method of using a computer system having a display and a pointing device to transform spatial data. The method includes displaying a first data set icon representing a first map data set comprising spatial data formatted in a first coordinate system, and displaying a second data set icon representing a second map data set having spatial data formatted in a second coordinate system. Also displayed is a data layer icon representing a data layer that contains some or all of the data of the first map data set. The data of the data layer is transformed to the second coordinate system in response to the pointing device being used to drag and drop the data layer icon onto the second data set icon.

In yet another aspect, the present invention provides a computer-readable medium containing instructions for controlling a computer system to perform the methods of transforming spatial data discussed above.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
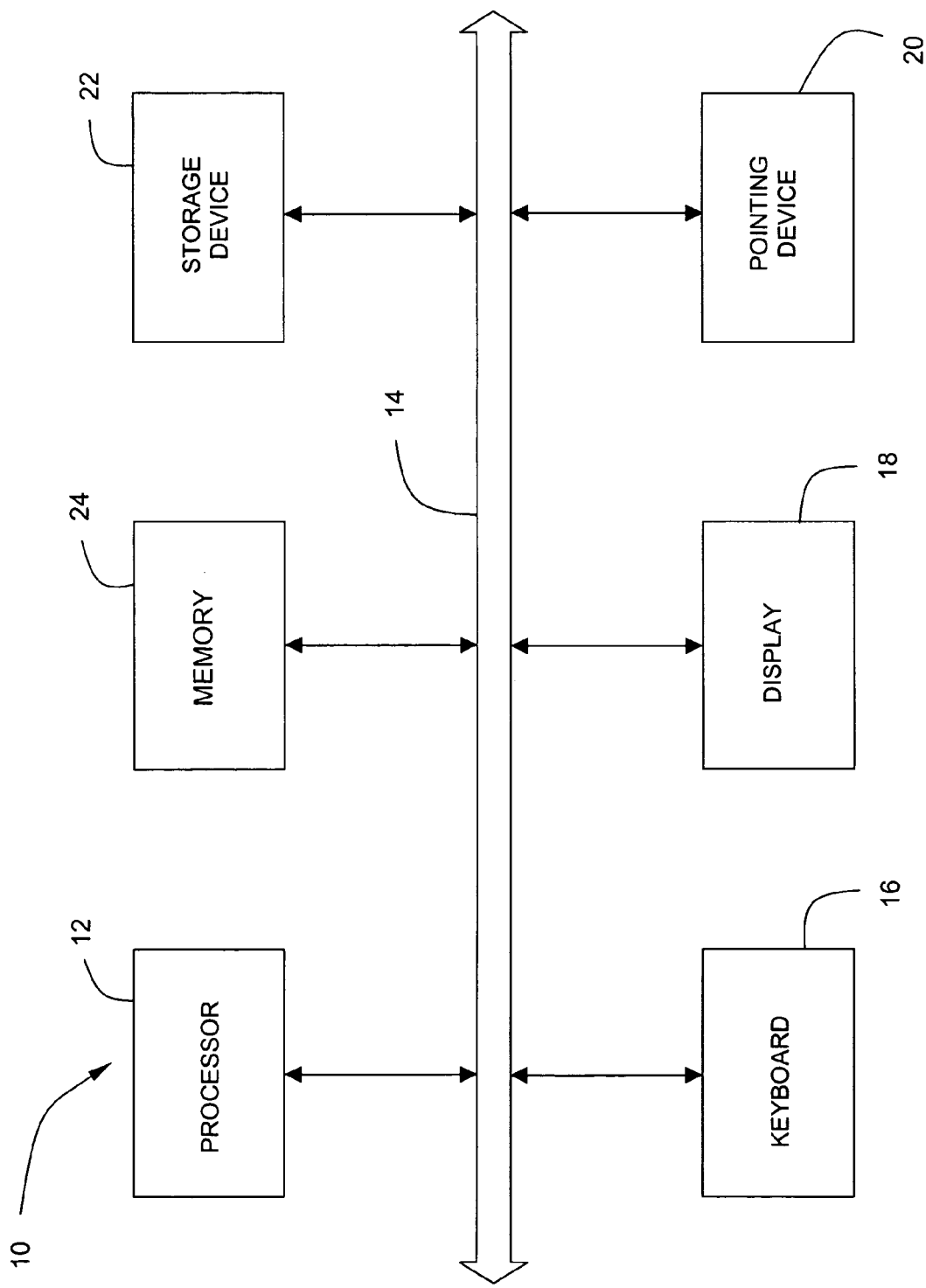
FIG. 1 is a block diagram of a computer system for implementing a software program for transforming spatial data.

The present invention relates to a software tool for transforming spatial data, such as for high quality map production or other types of applications. In one embodiment, the software includes a suite of plug-ins for vector graphics applications, such as Adobe Illustrator and Macromedia FreeHand, that enables a user to produce maps from geographic information systems (GIS) map data. The software can alternatively be embodied as a component of a standalone software application and need not necessarily result in high quality map production. One feature of the software is that users are able to import data, such as GIS data files, of varying coordinate systems for processing. When a GIS data file is imported, the software reads the file's coordinate system parameters, particularly the projection, so that these parameters are known for future processing. If the software does not recognize the projection, the user will be prompted to identify and enter the projection of the data file. The user will typically go to the data source to learn the projection when it is not known.

The software allows users to create and edit "map data sets" that can be selectively displayed. A map data set comprises a set of spatial data formatted in a specific co-ordinate system and thus contains the necessary information to display the spatial data as a map image. Each map data set may contain one or more data layers. A data layer is essentially a subset of the spatial data in a data set, although all of the spatial data of a data set can be contained in a single data layer. Data layers can be viewed as a way of organizing and managing the data. Various types of data layers are available. Area layers contain data that define a two-dimensional section, such as a country, state or lake. Line layers contain data that define a line, such as a road or river. Text layers contain textual data. Point layers contain data that define a point location, such as a city. The software can also include non-map data sets and layers; i.e., sets and layers that have no geographic data but contain data relating to logos, photographs, etc. that may be used in a map. Map data sets are created automatically by the software when data are imported into the application. A user can also create a map data set by manually specifying the required parameters. Map data sets are fully editable.

The software also provides for the display of certain graphical representations of data sets and/or data layers that collectively function as a user interface for managing map data sets and data layers. Namely, the graphical representations enable the transformation of spatial data from one coordinate system to another through a simple drag-and-drop technique that is described in more detail below. These graphical representations can comprise icons, text, images or any other displayed object for representing a data set or layer. In one embodiment, the graphical representations are displayed in an object palette or listing that also includes a variety of functions to create and edit map data sets.

Referring now to the drawings wherein identical reference numerals denote the same elements throughout the various views, FIG. 1 shows a block diagram of a computer system 10 that can be used to implement the software described above. The computer system 10 contains a processor 12 that communicates with other elements of the computer system 10 over a system bus 14. A keyboard 16 allows a user to input information into the computer system 10, and a display 18 allows the computer system 10 to output information to the user. A pointing device 20 is provided for moving the cursor or pointer on the display 18 and inputting information. The pointing device 20 is typically a mouse, but can also be a touch pad or a button device commonly used in laptop computers. A storage device 22 is used to store data and programs within the computer system 10. A memory 24, also attached to the system bus 14, contains an operating system.

With any implementation, the software described above can be loaded into the computer system 10 via a removable computer readable medium (such as a floppy disk, CD-ROM or the like) inserted into the appropriate drive of the computer system 10 and accessed from there. Alternatively, the software could be accessed from the removable computer readable medium inserted into the appropriate drive. The software could also be accessed via the Internet or another computer network. As used herein, the term "computer-readable medium" refers generally to any medium from which stored data can be read by a computer or similar unit. This includes not only removable media such as the aforementioned floppy disk and CD-ROM, but also non-removable media such as a hard disk or integrated circuit memory device. While one exemplary computer system has been described for purposes of illustration, it should be noted that the present invention is not limited to implementation on this particular system. One skilled in the art will recognize that many other systems are possible.

Figure 2:
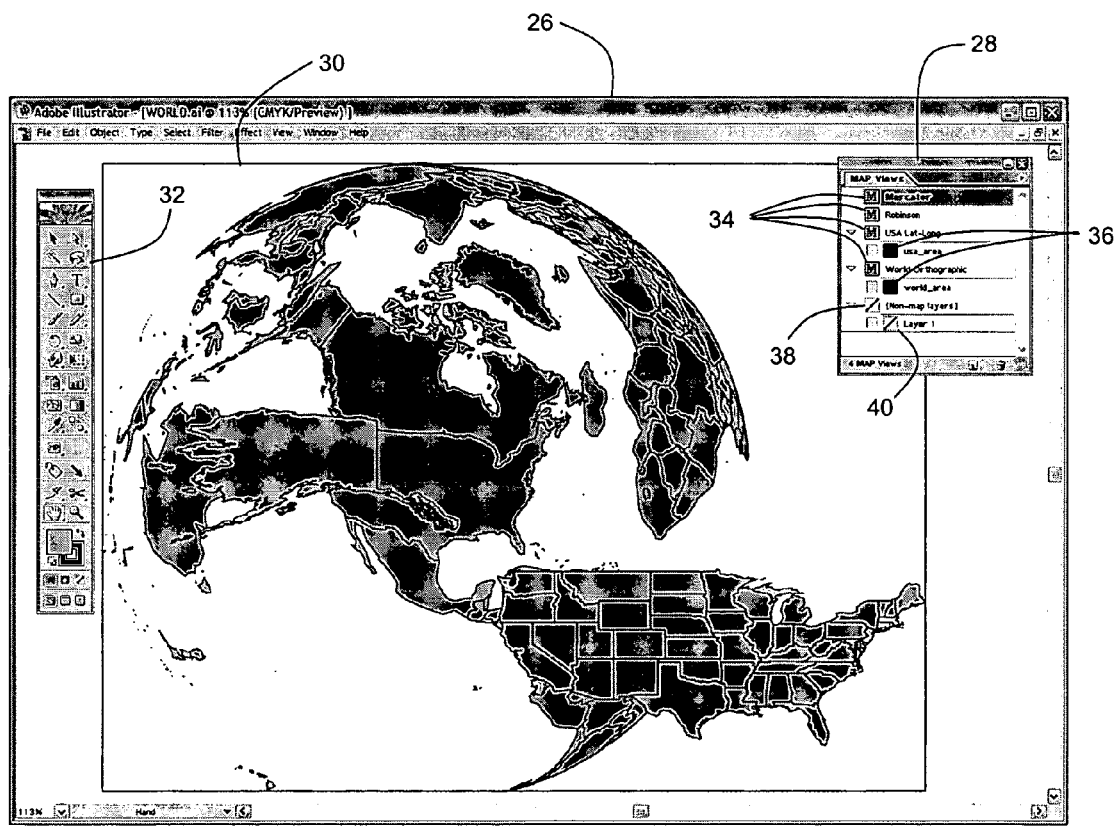
FIG. 2 shows a representation of a screen display from the above-mentioned software program.
Figure 3:
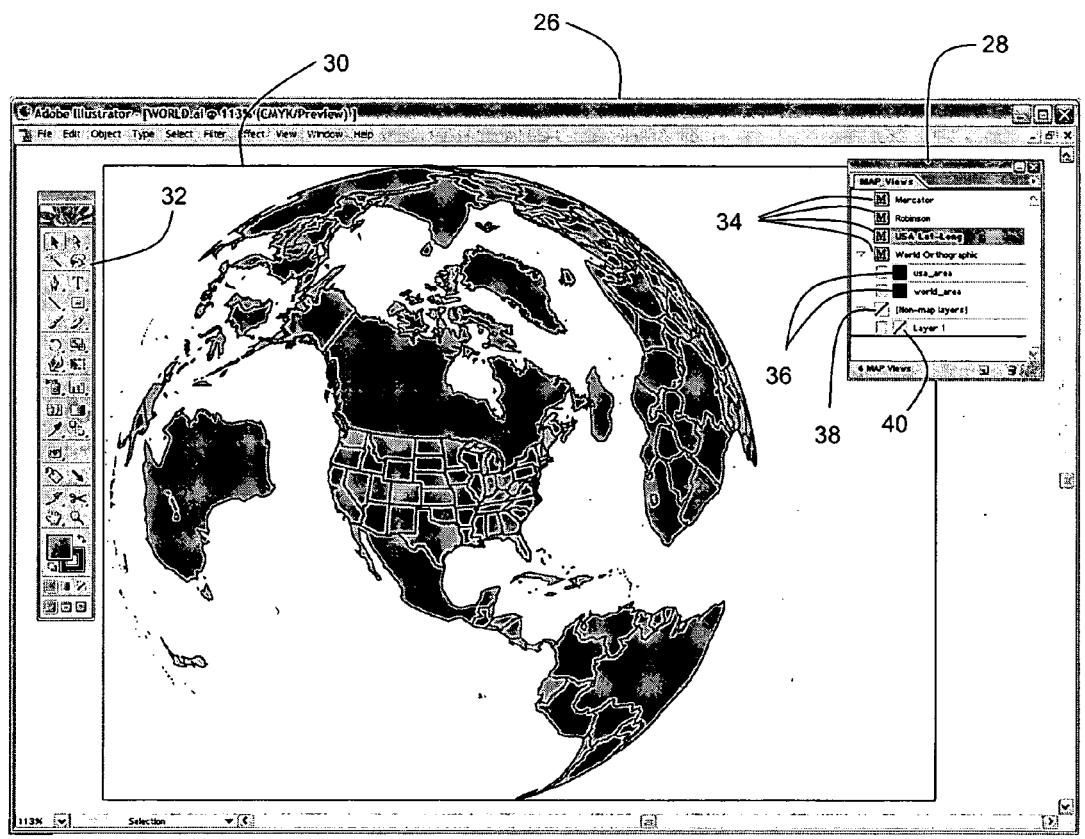
FIG. 3 shows a representation of the screen display after a spatial data transformation has been made.

FIGS. 2 and 3 show depictions of what is shown on the display 18 while the present software program is running, in accordance with one embodiment or instance of its use. The display 18 shows a display window 26 that includes an object palette 28, an image display section 30 and a toolbar 32 that contains various tools for editing map images (the toolbar 32 is optional and is not necessarily present in all embodiments). As previously mentioned, the object palette 28 functions as a user interface for managing map data sets and data layers. To this end, the object palette 28 displays a series of data set icons 34 that represent specific map data sets. Each of the represented map data sets will have a corresponding co-ordinate system, which will likely be a different system for each map data set. In the illustrated example, there are four data set icons 34, identified as Mercator, Robinson, USA Lat-Long and World Orthographic, respectively. The object palette 28 also displays data layer icons 36 that represent data layers. Each data layer icon 36 is shown as being associated with a corresponding data set icon 34. This is accomplished in the illustrated example by positioning the data layer icon directly below the data set icon it is associated with. For example, in FIG. 2, the usa_area data layer icon is positioned under the USA Lat-Long data set icon and the world_area data layer icon is positioned under the World Orthographic data set icon. The object palette 28 further includes data set icons 38 and data layer icons 40 for non-map data sets and layers. As previously mentioned, these non-map data sets and layers contain data relating to logos, photographs, and other such non-geographic information or artwork that might appear on a map. It should be noted that while FIGS. 2 and 3 show graphical representations in the form of icons accompanied by text descriptions, the present invention includes using any graphical representations of data sets and/or data layers, including icons alone, text alone or other types of graphical representations such as images and the like. Furthermore, the graphical representations need not necessarily be displayed in a palette.

The image display section 30 displays map images corresponding to the map data sets that actually contain data. In the illustrated example, images corresponding to the USA Lat-Long and the World Orthographic map data sets are displayed in the image display section 30.

The present invention allows users to produce a spatial data transformation through a simple drag-and-drop step. To transform data, all a user needs to do is drag and drop the appropriate graphical representation corresponding to the selected data onto the graphical representation corresponding to the co-ordinate system that they would like to see the data in. In the illustrated embodiment, a user transforms the data in a given data layer by dragging and dropping the appropriate data layer icon onto the data set icon corresponding to the desired co-ordinate system. (The software can also be configured to transform data in response to a data set icon being dragged and dropped onto another data set icon.) The process is a simple matter of using the pointing device 20 to place the curser over the data layer icon of the layer to be transformed (within the object palette 28), holding down the appropriate mouse button (typically, but not necessarily, the left mouse button), and while keeping the appropriate mouse button depressed, dragging the mouse to the destination data set icon, and then releasing the appropriate mouse button. This results in an immediate transformation that can be instantly visualized on the display 18. The user can repeat this process as often as desired, as well as move back and forth.

For example, referring to the screen display of FIG. 2, suppose the user drags and drops the usa_area data layer icon 36 to the World Orthographic data set icon 34. This would result in the data of the usa_area data layer being transformed from the USA Lat-Long co-ordinate system to the World Orthographic co-ordinate system. As shown in FIG. 3, the image corresponding to the usa_area data layer is automatically re-projected, moved and resized in the image display section 30 to fit the parameters of the destination co-ordinate system. This image is perfectly positioned with respect to the existing image of the data from the world_area data layer icon. Also, in the object palette 28, the usa_area data layer icon is now positioned under the World Orthographic data set icon, along with the world_area data layer icon.

Figure 4:
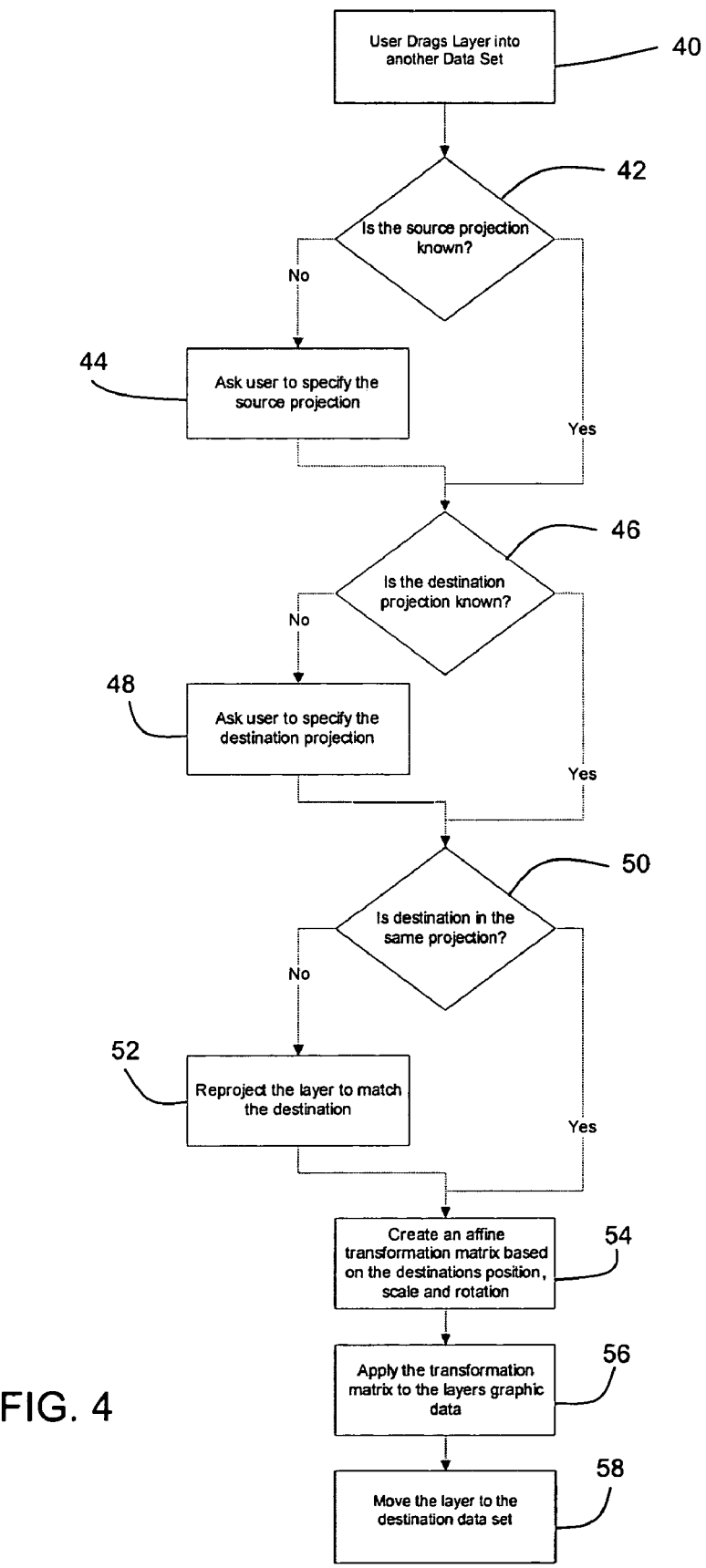
FIG. 4 shows a flow chart depicting a drag-and-drop transformation process.

Turning to FIG. 4, the manner in which the software performs the drag-and-drop transformation process is described. The process begins at block 40 when a user drags and drops the source data layer icon onto the destination data set icon as described above. Next, at block 42, the software determines if the projection of the source data is known. In other words, is the source projection recognized or was it identified when the data was imported. If not, the user is asked to specify the source projection at block 44. The software causes a dialogue box to pop up on the display 18 asking the user to enter the source projection. Once the user complies, the process moves to block 46. If the software does know the source projection at block 42, the process moves directly to block 46.

At block 46, the software determines if the projection of the destination co-ordinate system is known. If not, the user is asked to specify the destination projection at block 48. As before, the software causes a dialogue box to pop up on the display 18 asking the user to enter the destination projection. Once the user complies, the process moves to block 50. If the software does know the destination projection at block 46, the process moves directly to block 50.

At block 50, the software determines if the source and destination projections are the same. If no, the process moves to block 52. If yes, the process moves to block 54. At block 52, the data of the source data layer is re-projected to match the destination projection. The software performs the appropriate mathematical calculations on each data point to accomplish the re-projection. The mathematical calculations are generally known in the art and many are commercially available from various sources. At block 54, the software creates an affine transformation matrix based on the position, scale and rotation of the destination co-ordinate system. Next, the software applies the affine transformation matrix to the data of the source data layer at block 56, thereby transforming the source co-ordinate system parameters (other than projection, which has already been transformed) to match the destination co-ordinate system parameters. At block 58, the software moves the source data layer icon to be displayed under the destination data set icon, thereby completing the transformation.

While specific embodiments of the present invention have been described, it will be apparent to those skilled in the art that various modifications thereto can be made without departing from the spirit and scope of the invention as defined in the appended claims.

What is claimed is:

1. A method for transforming spatial data, said method comprising:
    electronically displaying a first graphical representation that represents spatial data formatted in a first coordinate system;
    electronically displaying a second graphical representation that represents spatial data formatted in a second coordinate system; and
    using a computer-based device to drag and drop said first graphical representation onto said second graphical representation so as to transform data represented by said first graphical representation from said first coordinate system to said second coordinate system.

2. The method of claim 1 wherein said first graphical representation represents a map data set and said second graphical representation represents another map data set.

3. The method of claim 1 wherein said first graphical representation represents a data layer and said second graphical representation represents a map data set.

4. The method of claim 1 wherein said first graphical representation is displayed as being associated with a third graphical representation before said first graphical representation is dragged and dropped onto said second graphical representation.

5. The method of claim 1 wherein said first graphical representation is displayed as being associated with said second graphical representation after said first graphical representation is dragged and dropped onto said second graphical representation.

6. A method of using a computer system having a display and a pointing device to transform spatial data, said method comprising:
    displaying on said display a first data set icon representing a first map data set, wherein said first map data set includes spatial data formatted in a first coordinate system;
    displaying on said display a data layer icon representing a data layer that contains some or all of said data of said first map data set;
    displaying on said display a second data set icon representing a second map data set, wherein said second map data set includes spatial data formatted in a second coordinate system; and
    transforming said data of said data layer to said second coordinate system in response to said pointing device being used to drag and drop said data layer icon onto said second data set icon.

7. The method of claim 6 wherein said data layer icon is displayed as being associated with said first data set icon before said data layer icon is dragged and dropped onto said second data set icon.

8. The method of claim 6 wherein said data layer icon is displayed as being associated with said second data set icon after said data layer icon is dragged and dropped onto said second data set icon.

9. The method of claim 6 further comprising transforming said data of said data layer back to said first coordinate system in response to said pointing device being used to drag and drop said data layer icon onto said first data set icon.

10. The method of claim 6 further comprising:
    displaying a third data set icon representing a third map data set, wherein said third map data set includes spatial data formatted in a third coordinate system; and
    transforming said data of said data layer to said third coordinate system in response to said pointing device being used to drag and drop said data layer icon onto said third data set icon.

11. A computer-readable medium containing instructions for controlling a computer system to perform a method for transforming spatial data wherein said method comprises:
    displaying a first graphical representation that represents spatial data formatted in a first coordinate system;

displaying a second graphical representation that represents spatial data formatted in a second coordinate system; and transforming data represented by said first graphical representation into said second coordinate system in response to said first graphical representation being dragged and dropped onto said second graphical representation.

12. The computer-readable medium of claim 11 wherein said instructions cause said first graphical representation to be displayed as being associated with a third graphical representation before said first graphical representation is dragged and dropped onto said second graphical representation.

13. The computer-readable medium of claim 11 wherein said instructions cause said first graphical representation to be displayed as being associated with said second graphical representation after said first graphical representation is dragged and dropped onto said second graphical representation.

14. The computer-readable medium of claim 11 wherein said first graphical representation represents a map data set and said second graphical representation represents another map data set.

15. The computer-readable medium of claim 11 wherein said first graphical representation represents a data layer and said second graphical representation represents a map data set.

* * * * *